United States Patent
Kikuchi et al.

(10) Patent No.: US 6,878,200 B2
(45) Date of Patent: Apr. 12, 2005

(54) MORTAR OR CONCRETE COMPOSITION

(75) Inventors: Masafumi Kikuchi, Nagareyama (JP);
Akio Koyama, Kawasaki (JP);
Usaburo Yano, Yokohama (JP);
Masahiko Minemura, Usui-gun (JP);
Akira Yamamoto, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/790,708

(22) Filed: Mar. 3, 2004

(65) Prior Publication Data

US 2005/0000392 A1 Jan. 6, 2005

(30) Foreign Application Priority Data

Jul. 1, 2003 (JP) .................................. 2003-189506

(51) Int. Cl.[7] .......................... C04B 24/40; C04B 40/00
(52) U.S. Cl. .................... 106/806; 106/675; 106/677; 106/708; 106/724; 106/790; 106/795
(58) Field of Search ................. 106/675, 677, 106/708, 724, 790, 795, 806

(56) References Cited

U.S. PATENT DOCUMENTS 4,394,335 A 7/1983 Roth et al.

FOREIGN PATENT DOCUMENTS

| JP | 55-42272 | 3/1980 |
|---|---|---|
| JP | 55-85452 | 6/1980 |
| JP | 55-90460 | 7/1980 |
| JP | 1-044673 | 6/1982 |
| JP | 57-123851 | 8/1982 |
| JP | 1-058148 | 12/1984 |
| JP | 8-26811 A | * 1/1996 |
| JP | 8-26811 | 1/1996 |
| JP | 2000-95999 A | * 4/2000 |
| JP | 2003-89567 A | * 3/2003 |
| JP | 2004-35289 A | * 2/2004 |
| WO | WO 82/02546 | 8/1982 |

* cited by examiner

Primary Examiner—Anthony J. Green
(74) Attorney, Agent, or Firm—Oblon, Spivak, McClelland, Maier & Neustadt, P.C.

(57) ABSTRACT

In a cold-curing mortar or concrete composition comprising calcareous and siliceous materials as predominant components, 0.3–2.5 wt % based on the calcareous material of a silicone oil having formula (1) is added. R is $C_{3-12}$ alkyl, R' is $C_{1-4}$ alkyl, y is such an integer that the number of R is 5–50 mol % of the total number of substituent groups directly attached to silicon atoms in a molecule, z is an integer of 0–5, and $3 \leq x+y+z \leq 30$. The set composition is improved in water repellency without incurring a drop of strength.

(1)

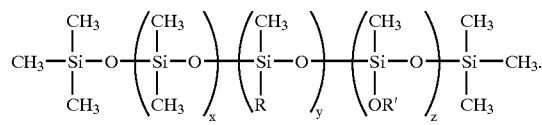

14 Claims, No Drawings

MORTAR OR CONCRETE COMPOSITION

BACKGROUND OF THE INVENTION

1. Field of the Invention

This invention relates to cold-curing mortar or concrete compositions useful as building and construction materials and more particularly, to mortar or concrete compositions which in the set state have excellent strength, water-proofness and water repellency as required for mortar or concrete and improved crack resistance and weather resistance under outdoor exposure conditions.

2. Background Art

Cement structures are generally defined as comprising as predominant components a calcareous material, that is, a raw material based on CaO units (e.g., quick lime, limestone, slaked lime, cement, calcium carbonate, etc.) and a siliceous material, that is, a raw material based on $SiO_2$ units (e.g., silica, sand, blast-furnace slag, fly ash, etc.). The cement structures include Autoclaved Lightweight aerated Concrete which has been aerated to have a low specific gravity and cold-curing mortar or concrete compositions using crushed stone as the aggregate and requiring high strength.

For the Autoclaved Lightweight aerated Concrete, it is known in the art to add various silicones for the purpose of improving water repellency.

For example, JP-A 55-42272 describes the addition of dimethylpolysiloxane, amino-modified polysiloxanes, polyether-modified polysiloxanes, alkyl-modified polysiloxanes, epoxy-modified polysiloxanes, fluorinated polysiloxanes, α-methylstyrene-modified polysiloxanes and alcohol-modified polysiloxanes. JP-A 55-85452 describes the addition of methylphenylpolysiloxane and chlorophenylmethyl-polysiloxane. JP-A 55-90460 describes the addition of methyl silicone varnishes, phenyl methyl silicone varnishes, blends or copolymers thereof with other organic monomers or polymers, and silicone varnishes modified with alkyd, epoxy or acrylic resins. JP-A 57-123851 describes the addition of dimethylpolysiloxane, methylphenylpolysiloxane, methylhydrogenpolysiloxane or methylcarboxyl-modified polysiloxane, which has been emulsified with an anionic surfactant to improve its dispersion in slurry. JP-B 1-44673 describes the addition of siloxanes containing alkoxy groups; JP-B 1-58148 describes the addition of siloxanes containing alkyl groups; and JP-A 8-26811 describes the addition of silicone oils containing alkyl and alkoxy groups.

In the event of Autoclaved Lightweight aerated Concrete which does not require so high a strength, water repellency is improved by the internal addition of various silicones. In the event of cold-curing mortar or concrete using crushed hard sand stone or the like as coarse aggregate without blowing agents, the internal addition of silicone oil as water repellent, though somewhat effective for improving water repellency, has not been practically employed. This is because the internally added water repellent acts to inhibit hydrogen bonds between raw materials such as calcareous and siliceous materials, detracting from the strength which is the most important feature of mortar or concrete. It is thus a most common practice to apply a water repellent to the surface of mortar or concrete after shaping and setting.

However, the application of water repellent takes a certain time for coating operation and is uneconomical because of a loss of coating solution. Additionally volatilization of water repellent has negative impact on the environment. On the other hand, due to the widespread use of air conditioning systems, concrete often encounters an environment entailing a largely varying temperature difference between the interior and surface of concrete. There are increasing cases where cracks occur in concrete as a result of such temperature differences. Cracks on the concrete surface not only give rise to structural problems and act to degrade durability, but are also aesthetically undesirable. It is thus demanded to overcome this problem.

SUMMARY OF THE INVENTION

Therefore, an object of the invention is to provide a cold-curing mortar or concrete composition which in the set state has excellent strength, water-proofness and water repellency as well as improved crack resistance and weather resistance under outdoor exposure conditions.

The invention pertains to a mortar or concrete composition comprising calcareous and siliceous materials as predominant components. It has been found that by adding to the composition a specific amount of a silicone oil having an alkyl group in a specific range, a degree of polymerization in a specific range, and preferably an alkoxy group in a specific range, there is obtained a cold-curing mortar or concrete composition which sets into a product having excellent strength, water-proofness and water repellency as well as improved crack resistance and weather resistance under outdoor exposure conditions.

Accordingly, the present invention provides a cold-curing mortar or concrete composition comprising calcareous and siliceous materials as predominant components, wherein a silicone oil of the general formula (1) is added in an amount of 0.3 to 2.5% by weight based on the weight of the calcareous material.

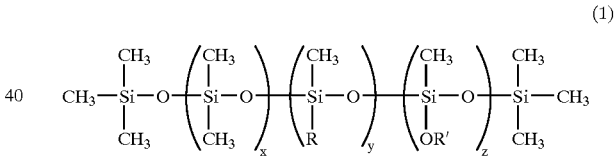

(1)

Herein R is an alkyl group having 3 to 12 carbon atoms, R' is an alkyl group having 1 to 4 carbon atoms, y is such an integer that the number of alkyl groups R is 5 to 50 mol % of the total number of substituent groups directly attached to silicon atoms in a molecule, z is an integer of 0 to 5, and the sum of x+y+z is from 3 to 30.

DESCRIPTION OF THE PREFERRED EMBODIMENTS

The mortar or concrete composition of the invention comprises a calcareous material and a siliceous material as predominant components. The predominant raw materials used herein are not particularly limited as long as they are generally used in the manufacture of set shapes.

The calcareous material used herein may be selected from materials containing CaO units as the main component, for example, quick lime, limestone, slaked lime, cement, and calcium carbonate. The base in cement composition is most often normal Portland cement, although use may also be made of other Portland cements such as early-strength Portland cement, ultra-high early-strength Portland cement, moderate heat Portland cement, and sulfate resisting Portland cement; blended cements such as blast-furnace slag cement, silica cement and fly-ash cement; and special cements such as alumina cement, lime cement, manganese cement, chromium cement, and titanium cement. Of these, Portland cement and blast-furnace slag cement are desirable. A mixture of two or more such cements may also be used as the cement component.

The siliceous material used herein may be selected from materials containing $SiO_2$ units as the main component, for example, silica, sand, siliceous sand, blast-furnace slag, and fly ash.

The blending proportion of calcareous material and siliceous material is not particularly limited because it largely varies depending on the application of set shapes. Usually the proportion is between 70:30 and 30:70 in weight ratio.

The silicone oil used herein has the general formula (1):

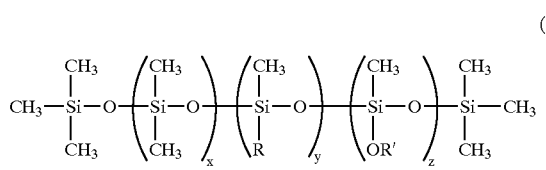

(1)

wherein R is an alkyl group having 3 to 12 carbon atoms, R' is an alkyl group having 1 to 4 carbon atoms, y is such an integer that the number of alkyl groups R is 5 to 50 molt of the total number of substituent groups directly attached to silicon atoms in a molecule, z is an integer of 0 to 5, and the sum of x+y+z is from 3 to 30.

More particularly, R is an alkyl group having 3 to 12 carbon atoms, preferably 6 to 10 carbon atoms. If the number of carbon atoms in R is less than 3, weather resistance may be unsatisfactory. If the number of carbon atoms in R is more than 12, water repellency may be low. The R groups in a molecule may be the same or different.

The letter y, which represents the number of groups R in a molecule, is such an integer that the number of groups R in the silicone oil is 5 to 50 mol %, preferably 8 to 30 mol %, and more preferably 8 to 20 molt of the entire substituent groups directly attached to silicon atoms in the silicone oil. With y in this range, the set composition is improved in weather resistance.

As the silicone oil, an organopolysiloxane further having an alkoxy group or groups is preferred. In this regard, R' is an alkyl group having 1 to 4 carbon atoms. The number of carbon atoms in R' is limited to the range of 1 to 4 in order to impart to the alkoxy groups (OR'-) reactivity with aggregates. Alkoxy groups having more than 4 carbon atoms tend to lose reactivity. The letter z, which represents the number of alkoxy groups in a molecule, is an integer of 0 to 5, preferably 1 or 2. If the number of alkoxy groups in a molecule of silicone oil is 6 or more, they may adversely affect the water repellency of the set composition.

The total number of siloxane units in the silicone oil of formula (1), represented by x+y+z, is from 3 to 30. If the total number of siloxane units is more than 30, the silicone oil has an excessive viscosity buildup and becomes difficult to uniformly disperse in mixing into a slurry.

Illustrative examples of the silicone oil are given below.

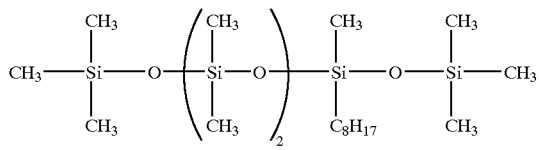

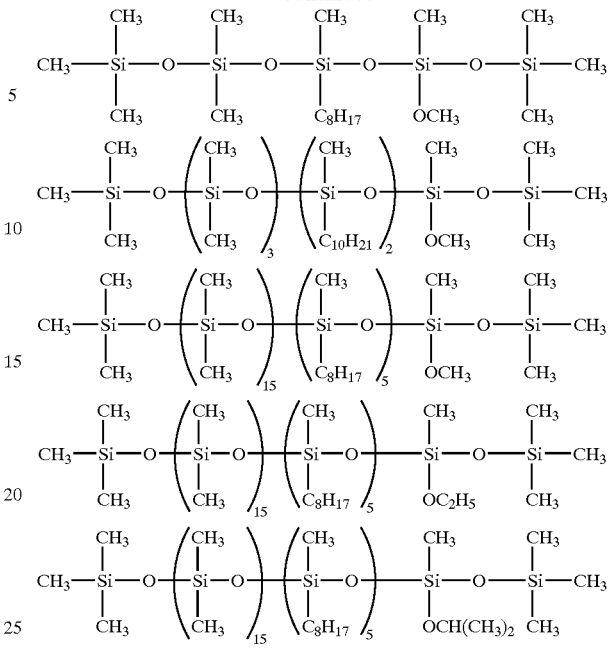

The silicone oil is added in an amount of 0.3 to 2.5% by weight, preferably 0.5 to 2.0% by weight, based on the weight of the calcareous material. Less than 0.3% by weight of the silicone oil fails to form a set product having satisfactory water repellency whereas more than 2.5% by weight of the silicone oil detracts from strength.

In the inventive composition, at least one silicone oil of formula (1) is added. It is acceptable to add a combination of two or more silicone oils of formula (1) or a combination of a silicone oil of formula (1) with another silicone oil. It is also acceptable to add the silicone oil or oils in emulsion form.

The silicone oil of formula (1) is generally synthesized, for example, by effecting addition reaction of a specific SiH group-bearing organopolysiloxane and an equimolar or less amount, based on the SiH groups, of an α-olefin compound represented by $CH_2=CH(CH_2)_nCH_3$, wherein n is an integer of 0 to 9, thereby synthesizing a silicone oil in which all the SiH groups are eliminated or one to five SiH groups per molecule are left. When it is desired to produce a silicon oil having an alkoxy group(s), the process proceeds to add to the silicone oil having a SiH group(s) left thereon an equimolar or more amount, based on the SiH groups, of an alcohol of 1 to 4 carbon atoms to effect dehydrogenation reaction, thereby introducing an alkoxy group(s). For the addition reaction and dehydrogenation reaction, a platinum compound such as chloroplatinic acid is generally used as a common catalyst.

In the mortar or concrete composition comprising calcareous and siliceous materials as predominant components according to the invention, aggregates are usually included. Use may be made of aggregates customarily used in the preparation of mortar and concrete, such as fine aggregates, coarse aggregates and lightweight aggregates. Examples of the aggregate which can be used herein include fine aggregates such as river sand and pit sand, coarse aggregates such as river gravel and crushed stone, and lightweight aggregates such as expansible shale, calcined fly ash, perlite, and vermiculite. Such aggregates are typically used in amounts of less than about 3,000 parts by weight, preferably about 50 to 1,500 parts by weight per 100 parts by weight of the calcareous material.

In addition to the aforementioned components, various other components may be added to the inventive composition if necessary. Such optional components are admixtures or additives including reinforcements such as glass fibers, synthetic fibers, and pulp, wood chips, mineral oil, accelerating air-entraining (AE) agents, (air-entraining) water-reducing agents, super-plasticizers, setting accelerators, setting retarders, accelerators, water-proof agents, anti-freezing agents, shrinkage-reducing agents, polymer dispersions (latexes), anti-corrosive agents, thickeners, anti-foaming agents, and air content adjusting agents.

In preparing the inventive composition, the weight ratio of water to calcareous material is usually set in a range between 0.2 and 0.8, preferably in a range between 0.4 and 0.7.

The cold-curing mortar or concrete composition of the invention can be prepared by mixing the aforementioned components in a mixer or kneader commonly used in the mixing of cement compositions such as a grouting mixer, mortar mixer or concrete mixer.

A set shape is produced from the inventive composition by adding water to the composition to form a slurry, casting the slurry into a mold or frame, and curing at normal temperature.

EXAMPLE

Examples of the invention are given below by way of illustration and not by way of limitation.

Mortar Composition

The cement used was normal Portland cement (density 3.16 kg/L), and the fine aggregate used was ISO standard sand as prescribed by JIS R-5201.

A mortar composition was prepared by mixing cement, fine aggregate and water in a weight ratio W/C of water to cement of 0.55 and a weight ratio C/S of cement to fine aggregate of ⅓.

The mortar was shaped and cured in humid air (20° C., RH 80%) for 48 hours and then removed from the mold. The sample as cured in humid air (20° C., RH 80%) for 5 days and then in ir (20° C., RH 60%) for 21 days.

The sample was subjected to a flexural strength test according to JIS R-5201, 10 Strength Test, and to an water absorption test according to JIS A-1404. Percent water absorption was computed:

water absorption (%)=$(m_1-m_0)/m_0 \times 100$ wherein $m_1$ is the weight (g) of the sample after 24 hour water absorption and $m_0$ is the weight (g) of the sample before water absorption.

Example 1

The silicone oil used was an organopolysiloxane of the following formula (2) having a viscosity of 40 mm²/s at 25° C. It was added in an amount of 0.5% by weight of the cement during the mixing step prior to shaping.

$$CH_3-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_{17}-\left(\underset{\underset{C_8H_{17}}{|}}{\overset{\overset{CH_3}{|}}{Si}}-O\right)_{5}-\underset{\underset{OCH(CH_3)_2}{|}}{\overset{\overset{CH_3}{|}}{Si}}-O-\underset{\underset{CH_3}{|}}{\overset{\overset{CH_3}{|}}{Si}}-CH_3 \quad (2)$$

Example 2

A shaped sample was produced as in Example 1 except that the silicone oil in Example 1 was added in an amount of 1.0% by weight of the cement.

Example 3

A shaped sample was produced as in Example 1 except that the silicone oil in Example 1 was added in an amount of 2.0% by weight of the cement.

Example 4

A shaped sample was produced as in Example 1 except that the silicone oil in Example 1 was added in an amount of 2.5% by weight of the cement.

Comparative Example 1

A shaped sample was produced as in Example 1 using only the cement, aggregate and water, but not the silicone oil.

Comparative Example 2

A shaped sample was produced as in Example 1 except that the silicone oil in Example 1 was added in an amount of 0.2% by weight of the cement.

Comparative Example 3

A shaped sample was produced as in Example 1 except that the silicone oil in Example 1 was added in an amount of 3.0% by weight of the cement.

Comparative Example 4

A shaped sample was produced as in Example 1 except that the silicone oil in Example 1 was added in an amount of 5.0% by weight of the cement.

Table 1 shows the results of a flexural strength test (4 week age sample) and a water absorption test (3 week age sample) on the shaped samples of Examples 1 to 4 and Comparative Examples 1 to 4.

TABLE 1

Mortar formulation outline and properties

| | W/C (%) | C/S | Si addition (wt %) | Unit water amount (kg/m³) | Unit weight (kg/m³) | | | Flexural strength (N/mm²) | Water absorption over time (%) |
|---|---|---|---|---|---|---|---|---|---|
| | | | | | C | S | Si | | |
| Example | | | | | | | | | |
| 1 | 55 | 0.33 | 0.5 | 275 | 499 | 1,498 | 2.5 | 8.1 | 0.65 |
| 2 | 55 | 0.33 | 1.0 | 275 | 499 | 1,498 | 5.0 | 8.2 | 0.60 |
| 3 | 55 | 0.33 | 2.0 | 275 | 499 | 1,498 | 10.1 | 8.2 | 0.43 |
| 4 | 55 | 0.33 | 2.5 | 275 | 499 | 1,498 | 12.5 | 8.2 | 0.45 |

TABLE 1-continued

Mortar formulation outline and properties

|  | W/C (%) | C/S | Si addition (wt %) | Unit water amount (kg/m³) | Unit weight (kg/m³) | | | Flexural strength (N/mm²) | Water absorption over time (%) |
|---|---|---|---|---|---|---|---|---|---|
|  |  |  |  |  | C | S | Si |  |  |
| Comparative Example |  |  |  |  |  |  |  |  |  |
| 1 | 55 | 0.33 | 0.0 | 275 | 499 | 1,498 | 0.0 | 8.1 | 7.20 |
| 2 | 55 | 0.33 | 0.2 | 275 | 499 | 1,498 | 1.0 | 8.0 | 6.80 |
| 3 | 55 | 0.33 | 3.0 | 275 | 499 | 1,498 | 15.0 | 7.1 | 0.45 |
| 4 | 55 | 0.33 | 5.0 | 275 | 499 | 1,498 | 25.0 | 6.3 | 0.45 |

W: water, C: cement, S: fine aggregate, Si: silicone oil
W/C: water/cement ratio set at 55/100 by weight
C/S: cement/fine aggregate ratio set at 1/3 by weight Concrete Composition The cement used was normal Portland cement (density 3.16 kg/L), the fine aggregate used was pit sand (absolute dry density 2.56 g/cm³, water absorption 2.00%), and the coarse aggregate used was crushed hard sand stone (absolute dry density 2.59 g/cm³, water absorption 1.06%). The weight ratio of water to cement was 0.45.

A concrete composition was prepared by mixing cement and fine aggregate, adding water or a water/silicone oil mixture thereto, intimately mixing them with a scoop, admitting coarse aggregate, and mixing.

A compressive strength test was carried out according to JIS A-1108 (compressive strength test for concrete) after the composition was cured according to JIS A-1129 (polymer-cement mortar). A water absorption test was carried out by curing the composition according to JIS A-1129 (polymer-cement mortar), immersing the sample in water for 24 hours, and determining an absorbed water weight from a weight gain. A water absorption ratio was computed:

water absorption ratio = $\Delta W_0/\Delta W_1$ wherein $\Delta W_0$ is the weight (g) of water absorbed by the sample without silicone oil and $\Delta W_1$ is the weight (g) of water absorbed by the sample having silicone oil incorporated.

Example 5

The organopolysiloxane of formula (2) having a viscosity of 40 mm²/s at 25° C., used in Example 1, was added as the silicone oil in an amount of 0.5% by weight of the cement during the mixing step prior to shaping.

Example 6

A shaped sample was produced as in Example 5 except that the silicone oil of formula (2) was added in an amount of 1.0% by weight of the cement.

Example 7

A shaped sample was produced as in Example 5 except that the silicone oil of formula (2) was added in an amount of 2.0% by weight of the cement.

Example 8

A shaped sample was produced as in Example 5 except that the silicone oil of formula (2) was added in an amount of 2.5% by weight of the cement.

Comparative Example 5

A shaped sample was produced as in Example 5 using only the cement, aggregates and water, but not the silicone oil.

Comparative Example 6

A shaped sample was produced as in Example 5 except that the silicone oil of formula (2) was added in an amount of 0.2% by weight of the cement.

Comparative Example 7

A shaped sample was produced as in Example 5 except that the silicone oil of formula (2) was added in an amount of 5.0% by weight of the cement.

Table 2 shows the results of a compressive strength test (4 week age sample) and a water absorption test (3 week age sample) on the shaped samples of Examples 5 to 8 and Comparative Examples 5 to 7.

TABLE 2

Concrete formulation outline and properties

|  | W/C (%) | Si addition (wt %) | Fine aggregate content* | Unit water amount (kg/m³) | Unit weight (kg/m³) | | | | | Compressive strength (N/mm²) | 24 hr water absorption ratio** |
|---|---|---|---|---|---|---|---|---|---|---|---|
|  |  |  |  |  | W | C | S | G | Si |  |  |
| Example |  |  |  |  |  |  |  |  |  |  |  |
| 5 | 45 | 0.5 | 44.0 | 165 | 163 | 367 | 771 | 993 | 1.8 | 52.6 | 0.64 |
| 6 | 45 | 1.0 | 44.0 | 165 | 161 | 367 | 771 | 993 | 3.7 | 52.5 | 0.63 |
| 7 | 45 | 2.0 | 44.0 | 165 | 158 | 367 | 771 | 993 | 7.3 | 52.6 | 0.34 |
| 8 | 45 | 2.5 | 44.0 | 165 | 156 | 367 | 771 | 993 | 9.2 | 52.5 | 0.25 |

TABLE 2-continued

Concrete formulation outline and properties

| | W/C (%) | Si addition (wt %) | Fine aggregate content* | Unit water amount (kg/m³) | Unit weight (kg/m³) | | | | | Compressive strength (N/mm²) | 24 hr water absorption ratio** |
|---|---|---|---|---|---|---|---|---|---|---|---|
| | | | | | W | C | S | G | Si | | |
| Comparative Example | | | | | | | | | | | |
| 5 | 45 | 0.0 | 44.0 | 165 | 165 | 367 | 771 | 993 | 0.0 | 52.5 | 1.00 |
| 6 | 45 | 0.2 | 44.0 | 165 | 162 | 367 | 771 | 993 | 0.7 | 52.5 | 0.85 |
| 7 | 45 | 5.0 | 44.0 | 165 | 152 | 367 | 771 | 993 | 18.4 | 48.1 | 0.18 |

W: water, C: cement, S: fine aggregate, G: coarse aggregate, Si: silicone oil
W/C: water/cement ratio set at 45/100 by weight
*absolute volume ratio of fine aggregate to the entire aggregates in concrete
**based on a ratio of 1.0 for the silicone oil-free sample (Comparative Example 5)

As is evident from the results in Tables 1 and 2, when the silicone oil is added in a narrow range of 0.3 to 2.5% by weight based on the weight of cement, unexpectedly the water absorption ratio is reduced without a drop of strength of concrete which has been of concern in the prior art.

Reference Example

The silicone oil of formula (2) used in Examples was synthesized as follows.

A 1-liter four-necked flask equipped with a stirrer, thermometer, Dimroth condenser and dropping funnel was charged with 356 g of a SiH-bearing methylpolysiloxane represented by the formula:

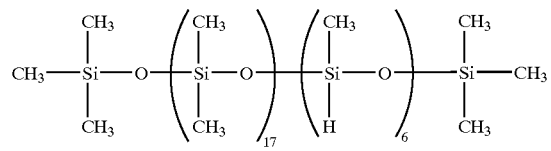

and 112 g of 1-octene. With five drops of a 1% isopropanol solution of chloroplatinic acid added, reaction was effected at 120° C. for 2 hours. The reaction solution was then cooled to 60° C. Thereafter, 36 g of isopropyl alcohol was added from the dropping funnel, and reaction was effected at 70° C. for one hour, synthesizing a silicone oil.

On analysis of the silicone oil by infrared spectroscopy, it was confirmed that SiH bonds and unsaturated bonds had disappeared. The addition reaction of 1-octene with SiH groups on methylpolysiloxane and the dehydrogenation reaction of isopropyl alcohol with the remaining SiH groups were demonstrated.

There has been described a cold-curing mortar or concrete composition comprising calcareous and siliceous materials as predominant components. When a silicone oil having an alkyl group in a specific range, a degree of polymerization in a specific range, and preferably an alkoxy group in a specific range is added in an amount of 0.3 to 2.5% by weight of the calcareous material, quite unexpectedly the water repellency of the set composition is improved without incurring a drop of strength.

Japanese Patent Application No. 2003-189506 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A cold-curing mortar or concrete composition, comprising: calcareous and siliceous materials as predominant components, wherein the composition contains a silicone oil in an amount of 0.3 to 2.5% by weight based on the weight of the calcareous material, said silicone oil having formula (1):

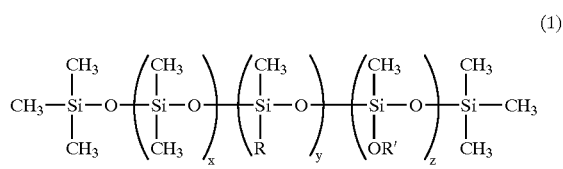

wherein R is an alkyl group having 3 to 12 carbon atoms, R' is an alkyl group having 1 to 4 carbon atoms, y is an integer such that the number of alkyl groups R is 5 to 50 mol % of the total number of substituent groups directly attached to silicon atoms in a molecule, z is an integer of 0 to 5, and the sum of x+y+z ranges from 3 to 30.

2. The cold-curing mortar or concrete composition of claim 1 wherein in formula (1), z is 1 or 2.

3. The cold-curing mortar or concrete composition of claim 1 wherein the amount of said silicone oil ranges from 0.5 to 2.0% by weight based on the weight of the calcareous material.

4. The cold-curing mortar or concrete composition of claim 1, wherein the calcareous material is normal Portland cement, early-strength Portland cement, ultra-high early-strength Portland cement, moderate heat Portland cement, sulfate resisting Portland cement, blast-furnace slag cement, silica cement, fly-ash cement, alumina cement, lime cement, manganese cement, chromium cement or titanium cement.

5. The cold-curing mortar or concrete composition of claim 1, wherein the siliceous material is silica, sand, siliceous sand, blast-furnace slag or fly ash.

6. The cold-curing mortar or concrete composition of claim 1, wherein the ratio of calcareous material to siliceous material ranges from 70:30 to 30:70.

7. The cold-curing mortar or concrete composition of claim 1, wherein the carbon atom content of substituent R ranges from 6 to 10 and the value of subscript y is such that the content of R groups in the silicone oil ranges from 8 to 30 mol %.

8. The cold-curing mortar or concrete composition of claim 1, wherein the composition further comprises an aggregate component which is fine aggregates of river sand or pit sand, a coarse aggregate of river gravel or crushed stone, or a lightweight aggregate of expansible shale, calcined fly ash, perlite or vermiculite.

9. The cold-curing mortar or concrete composition of claim 8, wherein the composition contains the aggregate in an amount of less than about 3,000 parts by weight per 100 parts by weight of the calcareous material.

10. The cold-curing mortar or concrete composition of claim 9, wherein the composition contains the aggregate in an amount of about 50 to 1,500 parts by weight per 100 parts by weight of the calcareous material.

11. The cold-curing mortar or concrete composition of claim 1, wherein the composition further comprises at least one additive selected from the group consisting of glass fibers, synthetic fibers, pulp, wood chips, mineral oil, accelerating air-entraining (AE) agents, (air-entraining) water-reducing agents, super-plasticizers, setting accelerators, setting retarders, accelerators, water-proof agents, anti-freeze agents, shrinkage-reducing agents, polymer dispersions (latexes), anti-corrosive agents, thickeners, anti-foaming agents and air content adjusting agents.

12. The cold-curing mortar or concrete composition of claim 1, wherein water is mixed into the calcareous material in a weight ratio ranging from 0.2 to 0.8.

13. The cold-curing mortar or concrete composition of claim 12, wherein water is mixed into the calcareous material in a weight ratio ranging from 0.4 to 0.7.

14. A method, comprising:
mixing water into a cold-curing mortar or concrete composition formed of a combination of calcareous material and siliceous material and a silicone oil having formula (1):

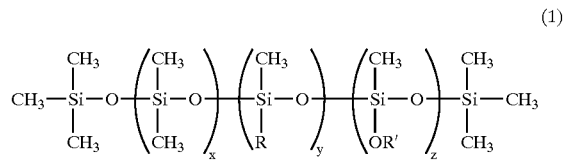

(1)

wherein R is an alkyl group having 3 to 12 carbon atoms, R' is an alkyl group having 1 to 4 carbon atoms, y is an integer such that the number of alkyl groups R is 5 to 50 mol % of the total number of substituent groups directly attached to silicon atoms in a molecule, z is an integer of 0 to 5, and the sum of x+y+z ranges from 3 to 30 in an amount of 0.3 to 2.5% by weight based on the weight of the calcareous material, thereby forming, when set, a hardened material that exhibits improved water absorption resistance and improved flexural strength.

* * * * *